US009549427B2

(12) United States Patent
Kalhan

(10) Patent No.: US 9,549,427 B2
(45) Date of Patent: Jan. 17, 2017

(54) TRANSMISSION OF DEVICE TO DEVICE SOUNDING REFERENCE SIGNALS USING MACROCELL COMMUNICATION RESOURCES

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 35 days.

(21) Appl. No.: 14/357,748

(22) PCT Filed: Nov. 12, 2012

(86) PCT No.: PCT/US2012/064712
§ 371 (c)(1),
(2) Date: May 12, 2014

(87) PCT Pub. No.: WO2013/074463
PCT Pub. Date: May 23, 2013

(65) Prior Publication Data
US 2014/0328299 A1 Nov. 6, 2014

Related U.S. Application Data

(60) Provisional application No. 61/559,393, filed on Nov. 14, 2011, provisional application No. 61/559,412, (Continued)

(51) Int. Cl.
H04W 72/04 (2009.01)
H04W 76/02 (2009.01)
(Continued)

(52) U.S. Cl.
CPC .......... H04W 76/023 (2013.01); H04L 5/0051 (2013.01); H04L 5/0053 (2013.01);
(Continued)

(58) Field of Classification Search
None
See application file for complete search history.

(56) References Cited

U.S. PATENT DOCUMENTS 8,432,786 B2 * 4/2013 Li .................... H04L 5/0007
370/208
8,483,105 B2 * 7/2013 Nanda ............... H04L 29/06068
370/278
(Continued)

FOREIGN PATENT DOCUMENTS

JP 05-145471 6/1993
JP H11-122159 4/1994
(Continued)

OTHER PUBLICATIONS

Lei Lei, Zhangdui Zhong, Chuang Lin & Xuemin Shen, "Operator Controlled Device-to-Device Communications in LTE-Advanced Networks", IEEE Wireless Communications, Jun. 2012, pp. 96-104, IEEE.

Primary Examiner — Candal Elpenord

(57) ABSTRACT

A first wireless communication user equipment (UE) device transmits a device-to device (D2D) Sounding Reference Signal (SRS) to a second wireless communication (UE) device using microcell communication resources. The second wireless communication (UE) device evaluates the SRS to discover the first wireless communication (UE) device, estimate channel conditions, and/or determine Channel State Information. Information indicative of the CSI is reported to a base station. Based on the reported channel conditions, (D2D) communication resources are scheduled by assigning microcell communication resources to the wireless communication (UE) devices.

20 Claims, 9 Drawing Sheets

Related U.S. Application Data filed on Nov. 14, 2011, provisional application No. 61/564,584, filed on Nov. 29, 2011.

(51) Int. Cl.
*H04W 8/00* (2009.01)
*H04L 5/00* (2006.01)

(52) U.S. Cl.
CPC ........... *H04W 8/005* (2013.01); *H04L 5/0007* (2013.01); *H04L 5/0091* (2013.01); *H04W 72/0406* (2013.01); *H04W 72/0493* (2013.01)

(56) References Cited

U.S. PATENT DOCUMENTS

| | | | |
|---|---|---|---|
| 2009/0110038 A1 | 4/2009 | Montojo et al. | |
| 2009/0238289 A1* | 9/2009 | Sampath | H04L 5/0044 375/260 |
| 2011/0134841 A1* | 6/2011 | Shaheen | H04W 4/00 370/328 |
| 2011/0258327 A1* | 10/2011 | Phan | H04W 16/10 709/227 |
| 2011/0275382 A1 | 11/2011 | Hakola et al. | |
| 2011/0305179 A1* | 12/2011 | Wang | H04L 1/0031 370/311 |
| 2012/0030358 A1* | 2/2012 | MacKenzie | H04W 52/0216 709/226 |
| 2012/0099540 A1* | 4/2012 | Doppler | H04J 11/0033 370/329 |
| 2012/0106517 A1 | 5/2012 | Charbit et al. | |
| 2013/0005377 A1 | 1/2013 | Wang et al. | |
| 2014/0064203 A1 | 3/2014 | Seo et al. | |
| 2014/0254486 A1 | 9/2014 | Sampath et al. | |

FOREIGN PATENT DOCUMENTS

| | | |
|---|---|---|
| JP | 2002-159050 | 5/2002 |
| JP | 2009-017560 | 1/2009 |
| JP | 2011-523267 | 8/2011 |
| WO | 2010082084 | 7/2010 |
| WO | WO 2010/082114 | 7/2010 |
| WO | WO 2011/069295 | 6/2011 |
| WO | WO 2011/109941 | 9/2011 |
| WO | WO 2011/130630 | 10/2011 |
| WO | 2013074463 | 5/2013 |
| WO | WO 2013/074462 | 5/2013 |

\* cited by examiner

TRANSMISSION OF DEVICE TO DEVICE SOUNDING REFERENCE SIGNALS USING MACROCELL COMMUNICATION RESOURCES

CLAIM OF PRIORITY

The present application claims priority to Provisional Application No. 61/564,584 entitled "SOUNDING REFERENCE SIGNALS TRANSMISSIONS FOR P2P COMMUNICATION USING MACROCELL DOWNLINK RESOURCES", to Provisional Application No. 61/559,412 entitled "SOUNDING REFERENCE SIGNALS TRANSMISSIONS FOR P2P COMMUNICATION USING MACROCELL DOWNLINK RESOURCES," filed Nov. 14, 2011, and to Provisional Application No. 61/559,393 entitled "P2P COMMUNICATION USING MACROCELL DOWNLINK RESOURCES," filed Nov. 14, 2011, all assigned to the assignee hereof and hereby expressly incorporated by reference in their entirety.

REFERENCE TO CO-PENDING APPLICATIONS FOR PATENT

The present application relates to PCT Application No. PCT/US2012/064711 (U.S. application Ser. No. 14/357,615), entitled "DEVICE-TO-DEVICE COMMUNICATION MANAGEMENT USING MACROCELL COMMUNICATION RESOURCES," filed on even date herewith, and assigned to the assignee hereof and expressly incorporated by reference herein.

FIELD

This invention generally relates to wireless communications Banc more particularly to transmission of device-to-device (D2D) sounding reference signets (SRS using macrocell communication resources.

BACKGROUND

Many wireless communication systems use base stations to provide graphical service areas where wireless communication user equipment (UE) devices communicate wt the base station providing the particular geographical service area. The base stations are connected within a network allowing communication links to be made between the wireless communication devices and other devices. In some circumstances, the communication links are between wireless communication UE devices that are close to each other, in these situations, it may be preferred to have a direct communication link between the two wireless UE devices rather than communicating through a base station. Such direct communication between devices is often referred to as device-to-device (D2D) communication or peer-to-peer (P2P) communication.

SUMMARY

A first wireless communication user equipment (UE) device transmits a device-to-device (D2D) Sounding Reference Signal (SRS) to a second wireless communication UE device using macrocell communication resources. The second wireless communication LIE device evaluates the SRS to discover the first wireless communication UE device, estimate channel conditions, end/or determine Channel State information. Information indicative of the CSI is reported to a base station. Based on the reported channel conditions, D2D communication resources are scheduled by assigning macrocell communication resources to the wireless communication (UE) devices.

DETAILED DESCRIPTION

Figure 1A:
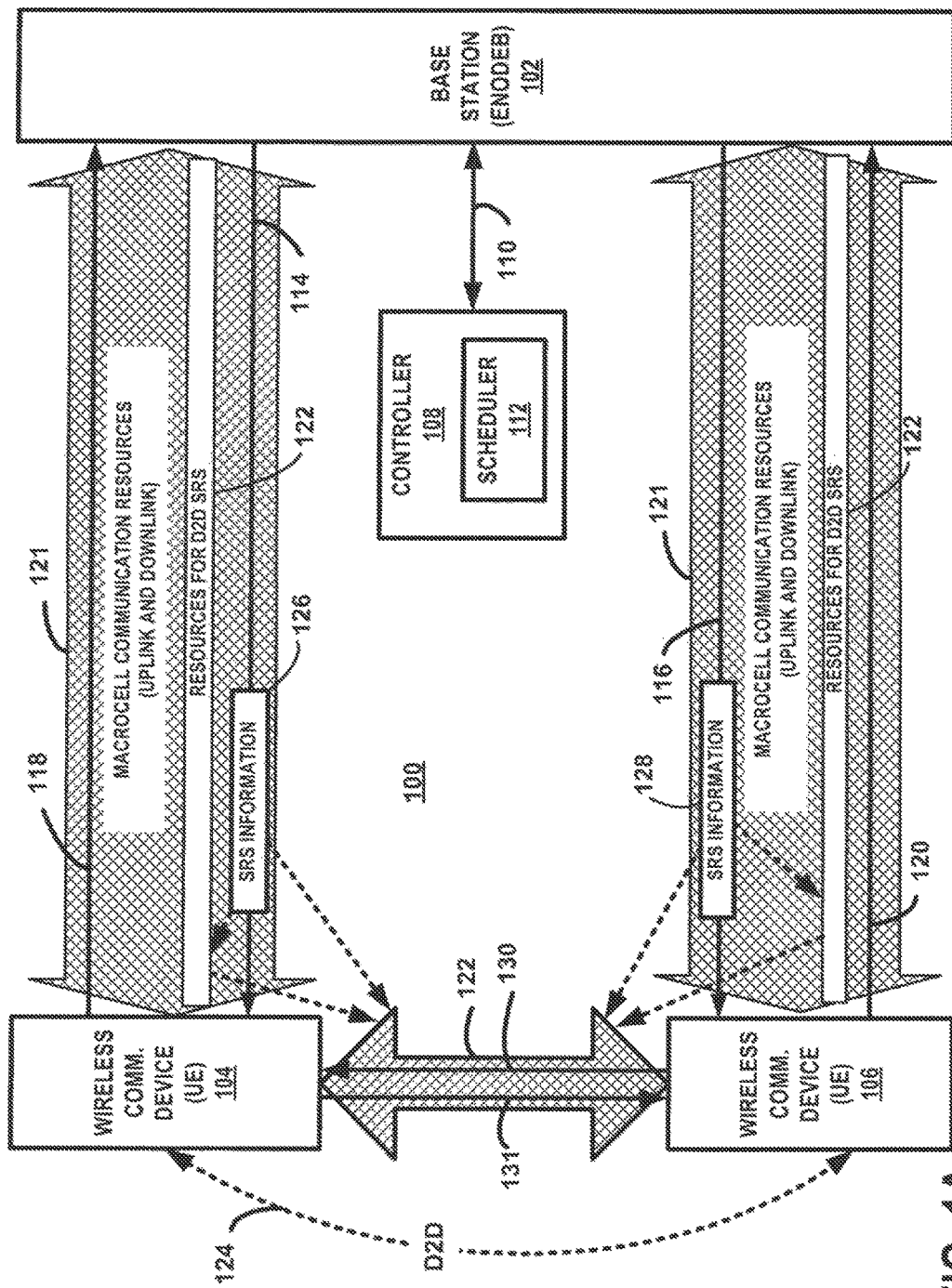
FIG. 1A is a block diagram of a communication system where macrocell communication resources are used for device-to-device (D2D) sounding reference signal (SRS) transmission.

A communication system utilizes macrocell communication resources for communication between base stations and wireless communication user equipment devices. The macrocell communication resources include downlink communication resources for downlink communication from a base station to wireless communication user equipment (UE) devices and uplink communication resources for uplink transmissions from the UE devices to the base station. The uplink communication resources are different from the downlink communication resources. Some of the macrocell communication resources are assigned to device-to-device (D2D) communication between two UE devices as needed. The downlink communication resources assigned for D2D communication are not used for downlink communication. For example, if the communication resources are time-frequency communication resources, the time segments and frequency bands assigned to the D2D communication link are not used by the base station. If uplink communication resources are assigned for D2D communication, the resources are assigned such that interference to other D2D communication and to uplink communication in adjacent cells, as well as the same cell, is minimized. Techniques for managing downlink resources for D2D communication are discussed in Patent Application Serial Number PCT/US2012/064711, entitled "DEVICE TO DEVICE COMMUNICATION MANAGEMENT USING MACROCELL COMMUNICATION RESOURCES", filed concurrently with this application and incorporated by reference in its entirety.

In conventional systems, the Channel State Information (CSI) is used to schedule communication resources for communication between the base station and the wireless communication UE device. Downlink reference signals are received at the UE device and evaluated to determine Channel State Information (CSI) which is reported back to the base station. The UE device also transmits sounding reference signals (SRS) to the base station to allow the base station to evaluate the uplink channels. Reference signals also enable discovery, acquisition, demodulation, and time alignment. For example, downlink reference signals transmitted by base stations are used by the UE devices to detect (discover) nearby base stations. Evaluation of the reference signals also provides channel estimation allowing the UE device to acquire and receive downlink signals transmitted by the base station. Time delays can be determined by observing the timing of the received reference signal to a transmission time of the signal.

For the examples described herein, D2D sounding reference signals (SRS) are transmitted between UE devices that are communicating, or that may communicate, over a device-to-device (D2D) communication link. A base station transmits control information to the UE devices identifying the macrocell communication resources that should be used for D2D SRS transmissions. The D2D SRS signals can be used for channel estimation, determining Channel State Information, device discovery, signal acquisition, and time alignment. The D2D SRS transmissions can also assist in demodulation of associated data symbols.

As discussed below in further detail, a wireless communication UE device determines channel state information (CSI) based on D2D SRS transmissions sent by another UE device and reports the CSI to a base station. Based on the reported CSI, a scheduler, controller, and/or base station schedules device-to-device (D2D) communication by assigning macrocell communication resources to the wireless communication (UE) devices.

As discussed in the above identified related patent application, communication resource allocation (CRA) information is sent by the base station to the wireless communication UE devices after a system controller determines that a D2D link should be established between the UE device and another UE device. The CRA information, therefore, reflects the scheduling based on the CSI.

FIG. 1A is a block diagram of a communication system 100 where macrocell communication resources are used for device-to-device (D2D) sounding reference signal (SRS) transmissions. A base station 102 provides wireless communication services to wireless communication user equipment (UE) devices 104, 106 within a geographical service area, sometimes referred to as a cell. Several base stations are typically interconnected through a backhaul to provide several service areas to cover large areas. The various functions and operations of the blocks described with reference to the communication system 100 may be implemented in any number of devices, circuits, or elements. Two or more of the functional blocks may be integrated in a single device and the functions described us performed in any single device may be implemented over several devices. For example, at least some of the functions of the controller 108 may be performed by the base stations 104, 106. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base station 102 is a fixed transceiver station, sometimes referred to as an eNodeB or eNB, which may include a controller in some circumstances. The base station 102 is connected to a controller 108 through a backhaul 110 which may include any combination of wired, optical, and/or wireless communication channels. For the examples herein, the controller 108 includes the functionality of the Mobility Management Entity (MME) and the Packet Gateway (P-GW). Accordingly, the controller 108 includes a scheduler 112. In the example, the scheduler 112 allocates time-frequency resources for communication between the wireless communication devices 104, 106 as well as between the base station 102 and the wireless communication devices 104, 106.

The wireless (UE) communication devices 104, 106 may be referred to as mobile devices, wireless devices, wireless communication devices, and mobile wireless devices, UEs, UE devices as well as by other terms. The wireless communication UE devices 104, 106 include electronics and code for communicating with base stations and with other wireless communication devices in D2D configurations. The wireless communication devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a wireless communication device 104. For example, a wireless communication device may include a wireless modem connected to an appliance, computer, television, or pool controller.

The base station 102 includes a wireless transceiver that exchanges wireless signals 114, 116, 118, 120 with the wireless communication devices 104, 106. Transmissions from the base stations and from the wireless communication devices 104, 106 governed by a communication specification that defines signaling, protocols, area parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a wireless communication device.

The macrocell communication resources 121 are used for transmitting the downlink signals 114, 116 and the uplink signals 118, 120. The base station 102 transmits downlink signals 114, 116 to the wireless communication devices 104, 106 using scheduled downlink communication resources of the defined downlink communication resources defined by the communication specification and reserved for downlink communication. The wireless communication devices transmit uplink signals 118, 120 to the base station using scheduled uplink communication resources of the defined uplink communication resources defined by the communication specification and reserved for uplink communication. The macrocell communication resources 121 include frequency bands divided in time where each frequency band and segment of time can be identified by the scheduler 112 and described in control signals sent from the base station 102 to the wireless communication devices 104, 106. The communication specifications, or other system rules, therefore, define applicable communication resources for the downlink and applicable communication resources for the uplink. The scheduler 112 allocates different time-frequency resources to different devices to efficiently utilize the resources while minimizing interference. Accordingly, the scheduled macrocell communication resources used for signals 114, 120 exchanged with one wireless communication device 104 are different from scheduled macrocell communication resources used for other signals 116, 118 exchanged with other wireless communication devices 106. As referred to herein, therefore, the macrocell communication resources 121 are the communication resources reserved for communication by the specification and/or communication system rules. The scheduled resources for transmission for particular signals, however, are a subset of the reserved macrocell communication resources 121.

In conventional systems, a scheduler allocates time-frequency resources for communication between the base station and the wireless communication devices. In addition, the controller, scheduler, and/or the base station schedule SRS signals on the uplink. In the examples discussed herein, however, the scheduler 112 also allocates (schedules) time-frequency resources 122 (D2D SRS communication resources 122) for transmission of D2D SRS from the wireless communication UE devices 104, 106 to establish and/or maintain a device-to-device (D2D) communication 124. For example, the D2D SRS transmissions can be used for device detection/discovery, signal acquisition (reception), channel estimation, and determining CSI.

The controller 108 allocates D2D SRS time-frequency resources 122 to the wireless communication devices 104, 106 by sending D2D SRS information 126 to the wireless communication devices. The D2D SRS information 126, 128 may be conveyed to the wireless communication UE devices using control signaling, messages or a combination of the two. For the examples herein, the D2D SRS information 126 is sent using control signals similar to conventional control signals establishing SRS transmissions to the base stations. The D2D SRS information 126, 128 identifies D2D SRS time-frequency resources 122 of the macrocell communication resources 121 to be used by the wireless communication devices for transmitting D2D SRS signals. In typical situations, the D2D SRS communication resources 122 are not changed frequently and are typically scheduled when changes occur in the systems 100 such as changes in the UE devices that are being served, for example.

The wireless communication device 104 receives the D2D SRS information 126 and use the allocated communication resources (time-frequency communication resource) to transmit D2D SRS signals 130 to other wireless communication devices 106 without communicating through the base station 102. The macrocell communication resources assigned for D2D SRS transmissions may be downlink communication resources or uplink communication resources depending on the particular implementation. As discussed below in further detail, if downlink resources are assigned for D2D SRS transmissions, those resources are not used for downlink communication by the as station. If uplink communication resources are assigned for D2D SRS transmission, the resources are allocated such that interference to other uplink and D2D communications is minimized.

Therefore, in accordance with the embodiments herein, some of the macrocell communication resources 122 are assigned (scheduled) for device-to-device (D2D) sounding reference signal (SRS) transmissions 130, 131 from wireless communication UE devices 104, 106. As discussed below in further detail, when downlink communication resources assigned for D2D SRS transmission, these resources are not used for downlink communication. For example, if the communication resources are time-frequency communication resources, the time segments and frequency bands assigned for D2D SRS transmissions are not used by the base station 102 to serve non-D2D wireless communication UE devices. Where uplink communication resources are assigned for D2D SRS transmissions, the resources are assigned such that the transmissions from on D2D wireless communication UE device does not interfere with communications with any other D2D wireless communication UE device pair or with uplink transmission to the base station.

The D2D SRS information 126 indicates the time-frequency resources to be used for the D2D SRS transmission. Such information may include a sequence for the D2D SRS transmissions where the transmissions hop between different frequencies. The wireless communication UE devices 104, 106 use a unique code, such as their device identifier (ID), to scramble the transmissions. Accordingly, UE devices receiving the D2D SRS transmissions are aware of the sequence and the scrambling code. This information may be provided to the UE devices by the base station. The information can be based on a UE device ID, Cell ID and/or combination of the two. An example of a suitable method for conveying the information includes sending the information during configuration of the D2D UE device pairs via downlink control channels or higher-layer messaging. The transfer of information can be provided semi-statically in some situations.

As mentioned above, the D2D SRS transmissions may be used by other UE devices to discover the UE device transmitting the D2D SRS message. The UE devices, therefore, scan the communication resources for SRS transmissions. After detection of a SRS transmission, a detecting UE device may further evaluate the transmissions to identify the transmitting UE device. Such information may be forwarded to the base station to enable the base station to make decisions regard establishing D2D links.

A UE device receiving a D2D SRS transmission may further utilize the SRS transmission to estimate channel conditions. The information can be used by the receiving UE device to receive other transmissions from the UE device transmitting the SRS transmissions. In addition, the measured channel conditions can below to generate Channel State Information (CSI) that is forwarded to the base station. The scheduler applies the CSI to efficiently schedule D2D communication resources for use by the two UE devices. In some situations, the UE devices may simply forward the channel estimation measurements, in other situations, the CSI can be expressed and sent to the base station as a function of the channel estimation measurements. Other techniques can be used to convey the CSI. Accordingly, information indicative of the CSI is forwarded where the information may be one of an several suitable forms.

D2D SRS transmissions can also be used for demodulation in some circumstances. For example, if D2D SRS are transmitted along the D2D data channels (symbols) during D2D communication, the D2D SRS can be used for demodulation of the data symbols.

The D2D SRS transmissions provide a mechanism for determining timing. For example, the receiving UE device may determine and adjust a timing delay of signals transmitted by the UE device transmitting the SRS transmissions.

Figure 1B:
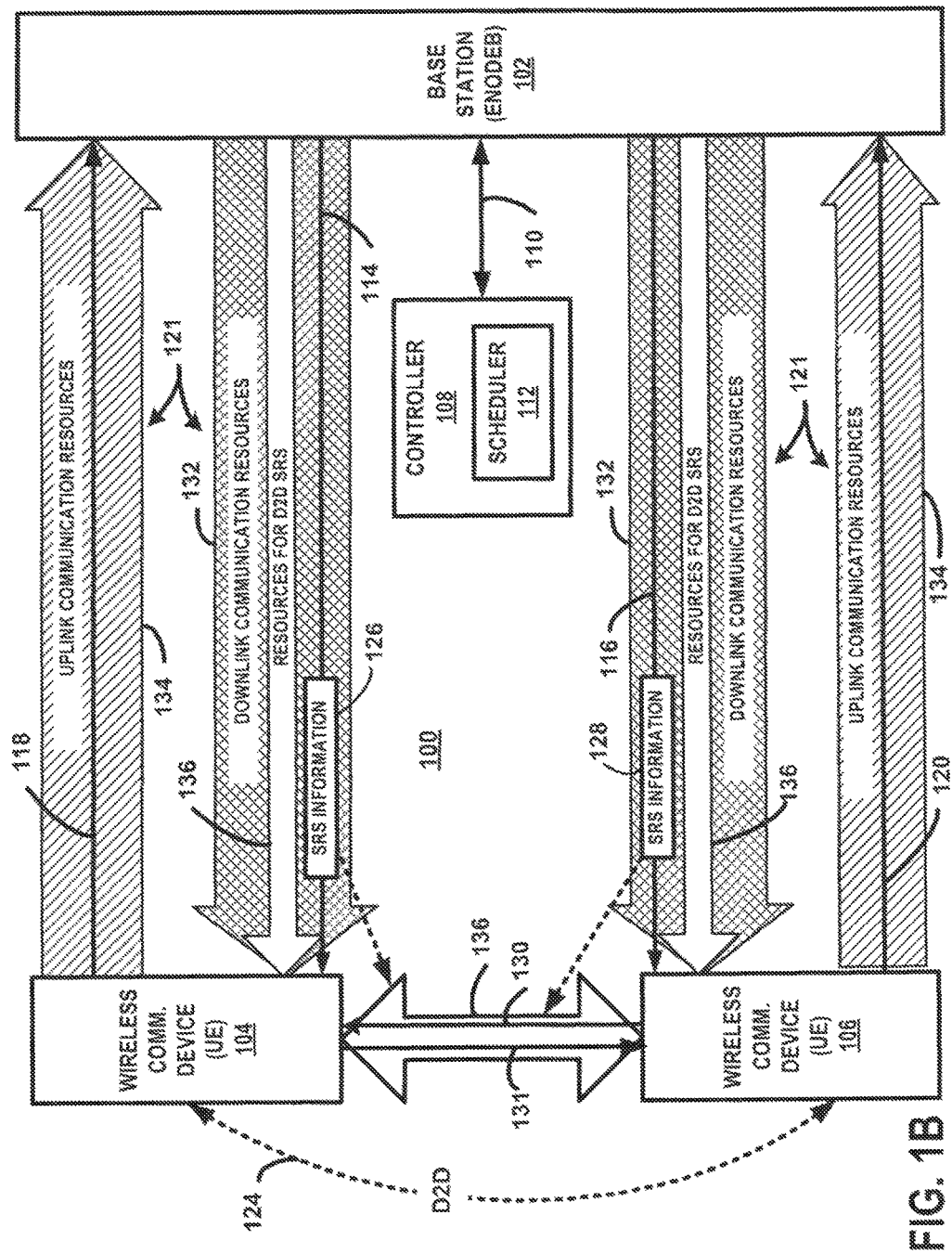
FIG. 1 is a block diagram of a communication system where downlink communication resources are used for device-to-device (D2D) sounding reference signal (SRS) transmission.

FIG. 1B is block diagram of the wireless communication system where defined downlink communication resources are scheduled as D2D SRS communication resources for D2D SRS transmissions. Accordingly, the system 100 of FIG. 1B is an example of the system 100 of FIG. 1A where the macrocell resources used for D2D SRS are downlink communication resources. As discussed above, the communication system utilizes downlink communication resources 132 for downlink communication from a base station to wireless communication user equipment (UE) devices and utilizes uplink communication resources 135 for uplink transmissions from the UE devices to the base station. The uplink communication resources are different from the downlink communication resources.

In accordance with the examples below, some of the downlink communication resources 132 are assigned for device-to-device (D2D) SRS transmission from UE devices as needed. The communication resources 136 assigned for D2D SRS transmission are not used for downlink communication. For example, if the communication resources are time-frequency communication resources, the time segments and frequency bands assigned for D2D SRS transmission are not used by the base station to serve non-D2D UE devices.

As described above, D2D SRS information is provided from the base station to UE devices. The UE devices transmits the D2D SRS signals using the assigned communication resources. As discussed herein, defined downlink communication resources are communication resources defined by a communication specification as the communication resources reserved for downlink communication from a base station to wireless communication devices, scheduled downlink communication resources are a subset of the defined downlink communication resources that have been assigned (scheduled) for downlink communication between a base station and a wireless communication device, and D2D SRS communication resources are a subset of the defined downlink communication resources that have been assigned (scheduled) for D2D SRS transmission from wireless communication UE devices.

The controller 108 allocates D2D SRS time-frequency resources 136 to the wireless communication devices 104, 106 by providing D2D SRS communication resource allocation information. The information may be transmitted using any number of control signals, and/or messages. The D2D SRS information 126, 128 identifies D2D time resources 136 of the downlink communication resources 132 to be used by the wireless communication devices for D2D SRS transmission.

Figure 2:
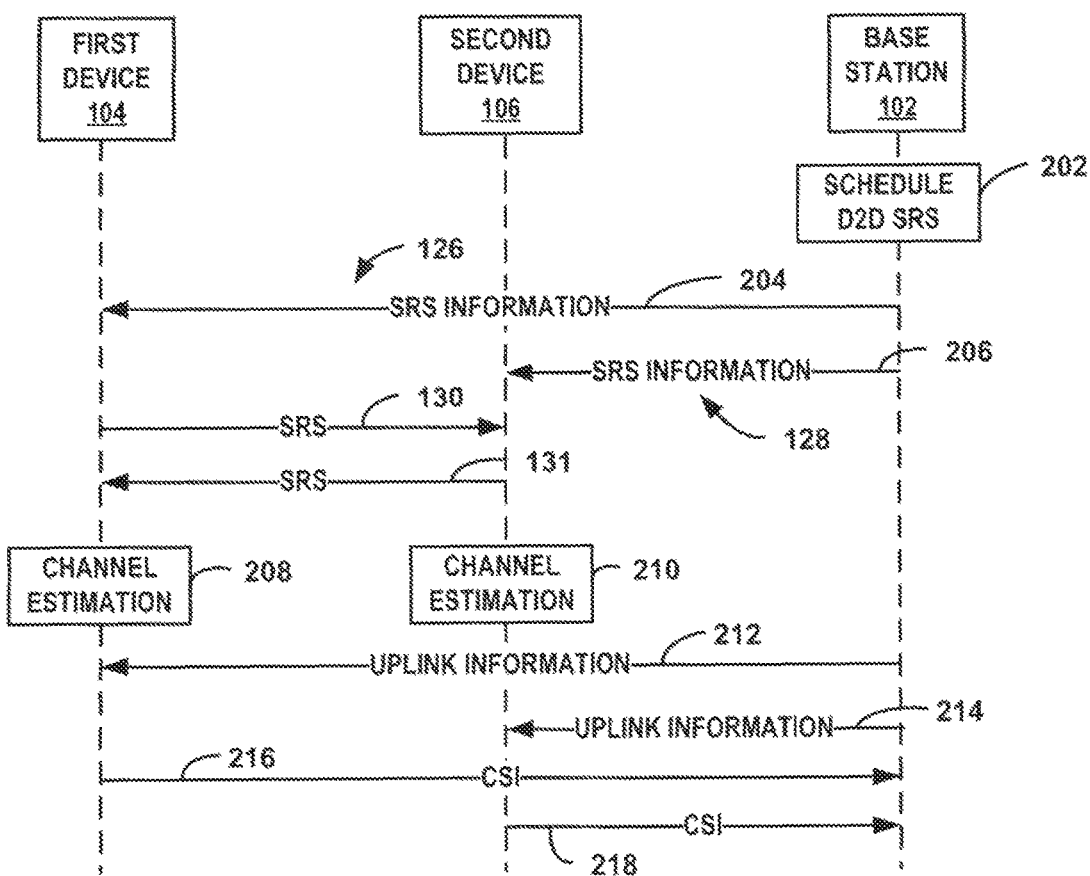
FIG. 2 is a messaging timing diagram for an example where device-to-device (D2D) link is established.

FIG. 2 is a messaging timing diagram for an example of managing device-to-device (D2D) SRS transmissions for determining and reporting Channel State Information (CSI) of the D2D communication link 124. The events and transmissions in FIG. 2 may be implemented in various ways depending on the particular system and communication specification.

The base station 102 schedules the D2D SRS communication resources at event 202. Under at least awareness of the scheduler, the base station 102 allocates a portion of the defined macrocell communication resources 121 for D2D SRS transmissions from the UE devices 104, 106. The scheduler may schedule the resources for SRS and instruct the based station to allocate the resources in some situations.

SRS information 126 is transmitted from the base station 102 to the first UE device 104 in SRS information transmission 204 and SRS information 128 is transmitted from the base station 102 to the second UE device 104 in a SRS information transmission 206. The SRS information transmissions 204, 206 include information instructing the UE devices on which communication resources should be used for transmitting SRS. As discussed below, the information is transmitted in a PDCCH for one example. Any combination of control signals and/or messages can be used to convey the D2D SRS information, however.

In accordance with the SRS information 126, the first UE device 104 transmits SRS transmissions 130 using the identified D2D SRS communication resources of the defined macrocell communication resources. In accordance with the SRS information 128, the second UE device 106 transmits SRS transmissions 131 using the identified D2D SRS communication resources of the defined macrocell communication resources. For the example, the D2D SRS communication resources used by each UE device are orthogonal to the D2D SRS communication resources used by other UE devices. Therefore, transmissions of SRS on a particular frequency from each UE device is during a time period when no other UE device is transmitting at that same frequency.

At events 208 and 210, the first UE device 104 and the second UE device 106 perform channel estimation by evaluating and measuring the D2D SRS transmissions, in accordance with known techniques of channel estimation, the UE devices 104, 106 measure the received SRS signals to determine parameters such as timing, path loss, and Multiple Input Multiple output (MIMO) characteristics. Although the measurements can be used for by the receiver in the UE device, the measurements can also be used to determine the CSI.

For the examples herein, the base station 102 instructs each UE device 104, 106 how to measure the D2D SRS transmissions. Information regarding the time-frequency resources used by other UE devices can be sent in control signals for example. In addition, scrambling codes, location(s) of resources used, receive power level, and other parameters may be sent to the UE device to facilitate detection and reception of the D2D SRS transmissions.

In situations where the D2D SRS transmissions are performed using uplink communication resources, the techniques employed by conventional base stations to measure uplink channel characteristics are applied in the UE devices. The UE devices in such implementations, therefore, include uplink receivers that can used to evaluate the SRS transmission as well as to receive other signals transmitted by other UE devices using uplink communication resources.

In situations where the D2D SRS transmissions are performed using downlink communication resources, the techniques in accordance with those employed by conventional UE devices for receiving reference signals transmitted by base stations can be used to evaluate and measure the D2D SRS transmissions and determine the channel characteristics of the D2D channels between two UE devices.

Uplink information transmissions 212 and 214 provide the UE devices 104, 106 with the uplink communication resources assigned for the UE devices to report the CSI. Each UE device 104, 106 transmits a CSI transmission 216, 218 using the communication resources assigned by the base station 102. The CSI transmissions 216, 218 may include measured parameters, calculated parameters, functions, or other information that describes the state of the measured channel.

Figure 3:
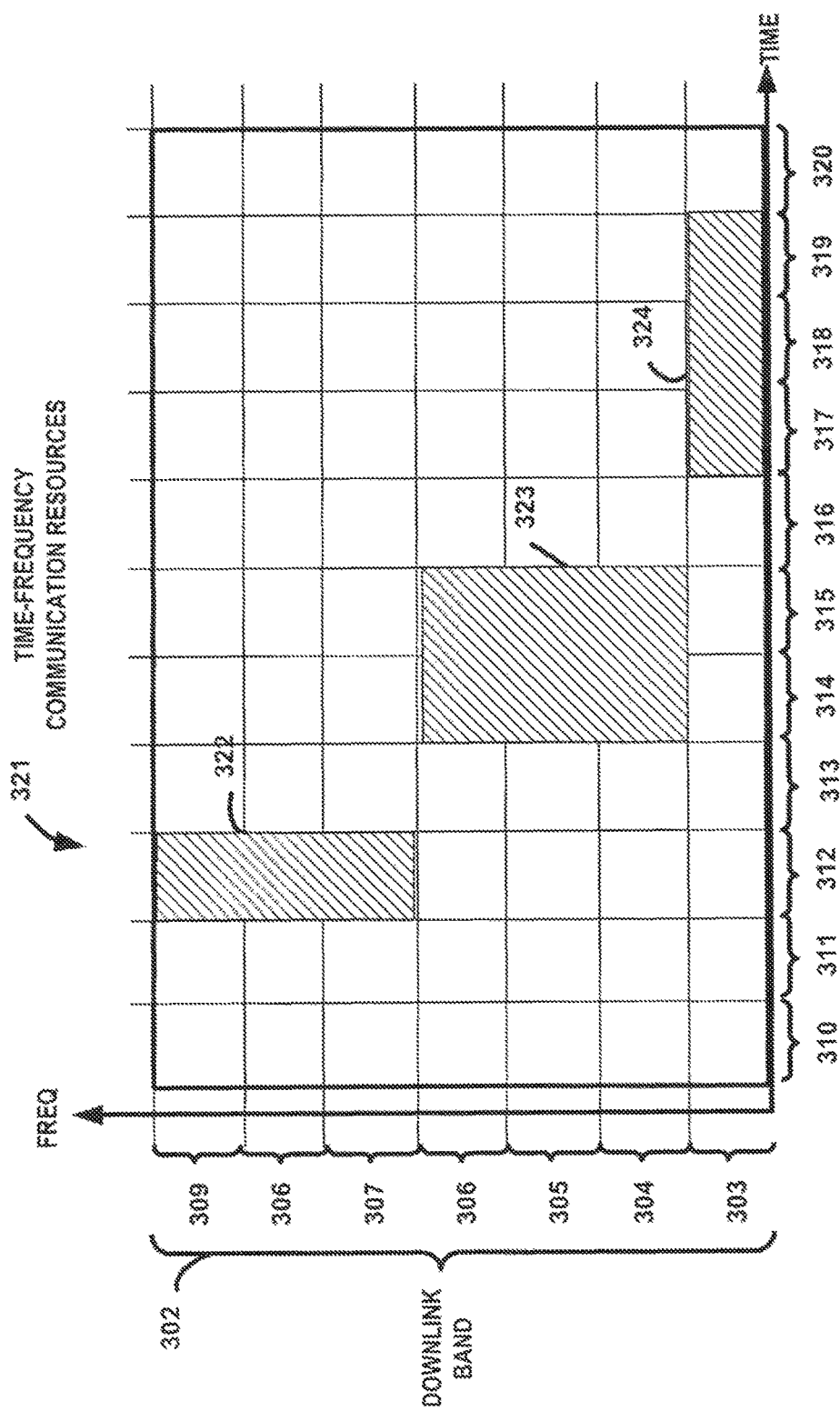
FIG. 3 is a graphical representation of an example of time-frequency communication resources in a downlink frequency band.

FIG. 3 is a graphical representation of an example of time-frequency communication resources 300 in a downlink frequency band 302, in order to efficiently use communication resources, frequency spectrum is divided in time and/or by coding. For example, OFDM systems, information is transmitted over a large number of closely spaced orthogonal sub-carrier signals. Crosstalk between the sub-carriers is minimized since the carriers are orthogonal. Information is separated into parallel channels and distributed over the sub-carriers. Each sub-carrier is modulated with a modulation scheme. The subcarriers are also divided in time to further allow for communication with multiple devices. Although the various divisions of frequency and time may be referred to by different terms, the divisions in frequency may be referred to as frequency subcarriers 303-309 and the divisions in time may be referred to as time segments 310-320. The time segments and frequency subcarriers may be further or grouped, and identified in accordance with a communication specification and system operating rules. The resources, for example, may be organized into time slots, frames, sub-frames and symbol times in repeating patterns. A specific example is discussed below with reference to FIG. 4. Generally, however, the available downlink spectrum 3 is divided in frequency and time and the resulting time-frequency resource units 321 are assigned to transmissions. Each time-frequency resource unit may be assigned individually or in groups. For example, a transmission may be assigned to a single time segment 312 over multiple frequency subcarriers 307, 308 as for the first transmission 322, over multiple time segments 314, 315 and multiple frequency subcarriers 304, 305 as in the second transmission 323, or for a single frequency band 303 over multiple time segments 317-319 as in the third transmission 324. In some circumstances the resource units may be assigned non-contiguously. For example, transmission 322 and 324 may be assigned to single device for a transmission.

In conventional systems, all of the time-frequency communication resources of the downlink frequency band are assigned for transmission only from base stations to wireless communication devices and all of the uplink communication resources are assigned for transmission only from wireless communication UE devices to base stations. Also, in conventional systems, reference signals are only transmitted from the base stations to the UE devices using downlink communication resources and SRS transmissions are only transmitted by UE devices to base stations using uplink communication resources. In the examples herein, however, some of the time-frequency communication resources are assigned to D2D SRS transmissions between wireless communication devices (UEs).

Figure 4:
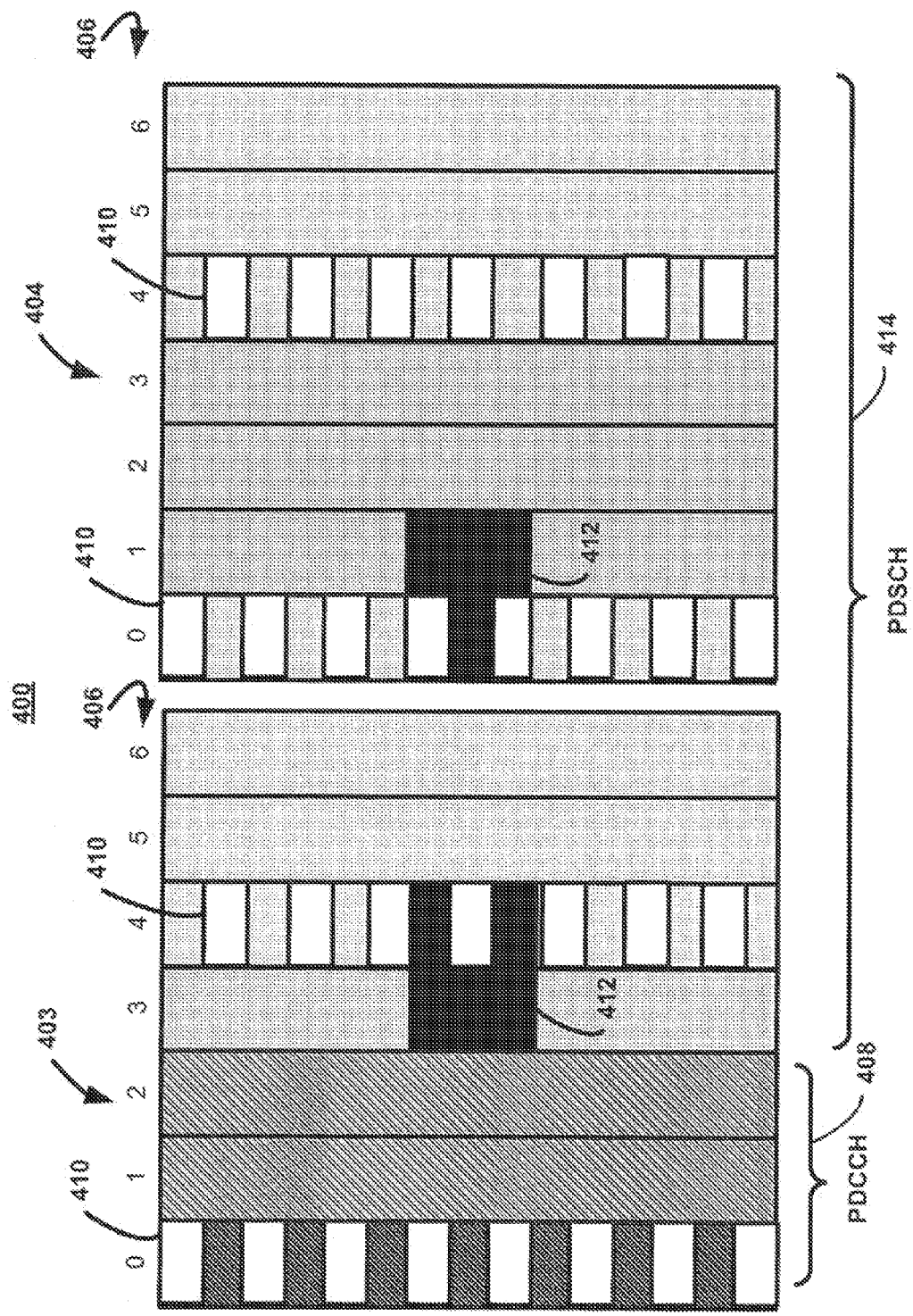
FIG. 4 is an illustration of a subframe in accordance with a 3GPP LTE communication specification.

FIG. 4 is an illustration of a subframe 400 in accordance with a 3GPP LTE communication specification. The subframe 400 includes two slots 402, 404, where each slot includes seen symbol times 406. The symbol times 0, 1 and 2 in the first slot 402 form a physical channel which is a Physical Downlink Control Channel (PDCCH) 408 in the specification. Pilot signals (or Reference Signals) 410 are injected at symbol times 0 and 4. The subframe 400 includes a channel that is a Physical Broadcast Channel (PBCH) 412 and spans portions of symbol times 3 and 4 of the first slot 402 and portions of symbol times 0 and 1 of the second slot 404. A data channel is provided by a Physical Downlink Shared Channel (PDSCH) 414 and is covered by the remainder of symbol times 3-6 of the first slot 402 and symbol times 1-6 of the second slot 404. The distribution and assignment of resource units depicted in FIG. 4 are provided as an example. Other combinations of resource blocks and resource elements may be used.

Figure 5:
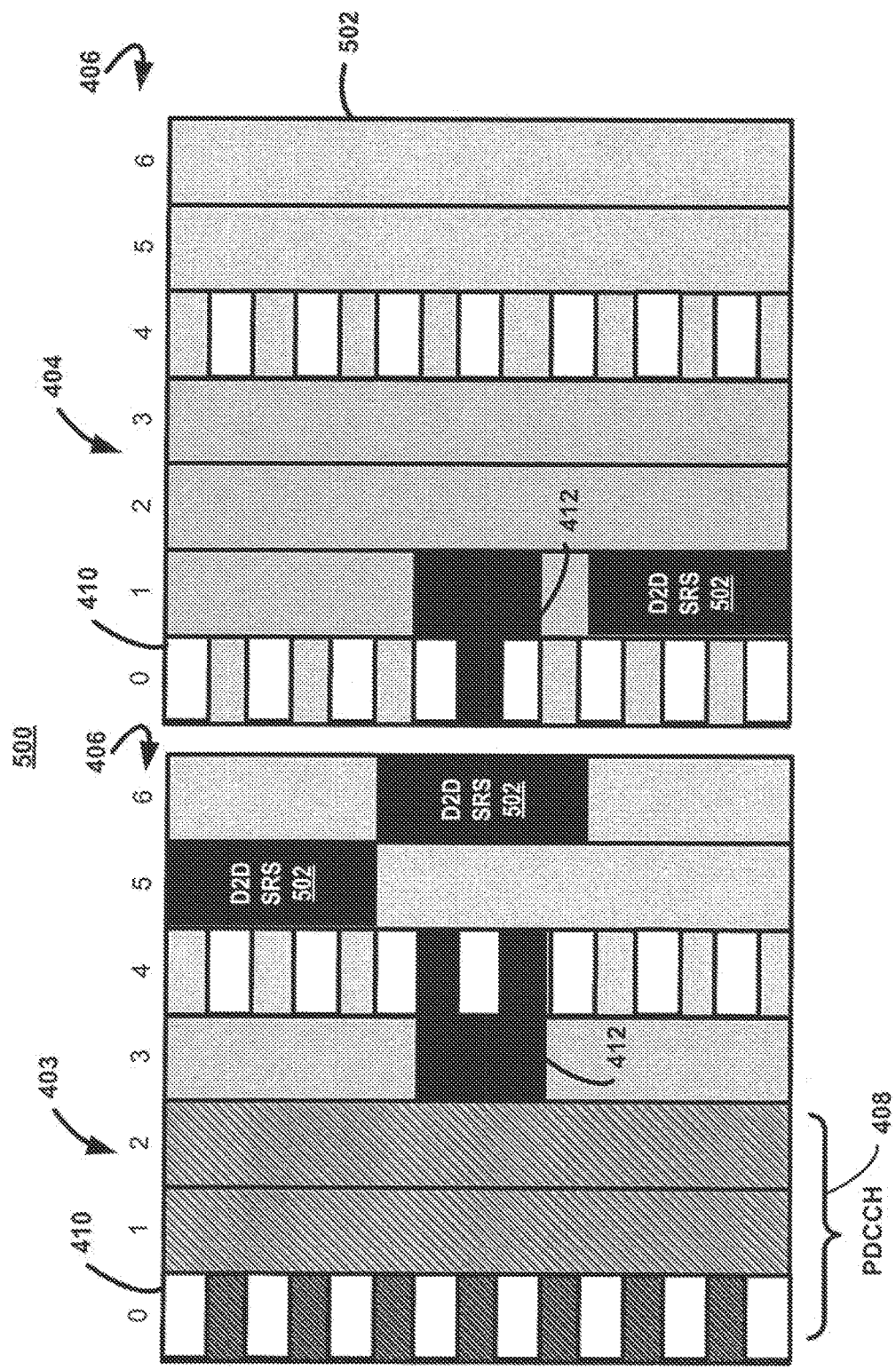
FIG. 5 is en illustration of an example of a subframe including device-to-device (D2D) channels for use in a system otherwise operating in accordance with a 3GPP LTE communication specification.

FIG. 5 is an illustration of an example of a subframe 500 including device-to-device (D2D) channels 502, 504 for use in is system otherwise operating in accordance with a 3GPP LTE communication specification. Accordingly the exemplary subframe 500 is modified version of a conventional 3GPP LTE subframe such as the subframe 400 of FIG. 4. The subframe 500 includes a channel 502 that is not defined in the current 3GPP LTE communication specification. The subframe may include additional D2D control and data channels. The Device-to-Device Sound Reference Signal Channel (D2DSRSCH) 502 provides for transmission of SRS numerous allocations of frequency time resources for the D2D SRS channels. Accordingly, other combinations of subcarriers and symbol times may be used for the D2SRSOCH 502. Although some conventional channels may be omitted in order to provide resources for the D2D control channels, reference signals such as PBCH, PSS/SSS control channels are retained in order to maintain backward compatibility. For example, D2D resources are not scheduled in subframes/slots that contain PBCH and the synchronization channels (PSS/SSS), D2D data/control content is not assigned on resources reserved for reference signals in subframes.

Figure 6:
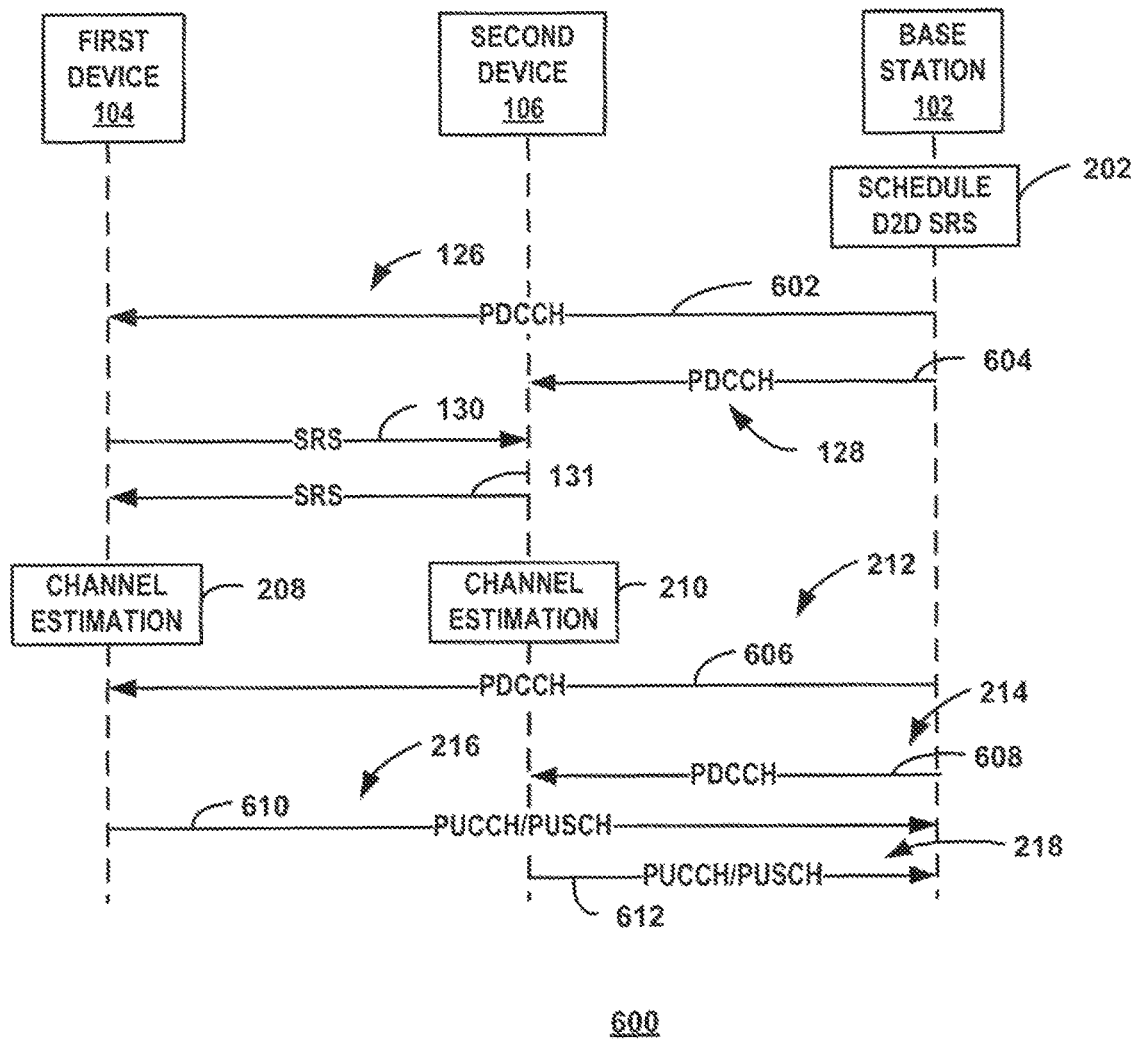
FIG. 6 is a messaging timing diagram for an example where a device-to-device (D2D) link is established in a system operating in accordance with a 3GPP LTE communication specification.

FIG. 6 is a messaging timing diagram 600 for an example of managing D2D SRS transmissions in a system operating in accordance with a 3GPP LTE communication specification. The messaging timing diagram 600, therefore, is an example of implementing the timing diagram 200 discussed with reference to FIG. 2.

The base station 102 schedules the D2D SRS communication resources at event 202. Under either knowledge or instruction of the scheduler, the base station 102 allocates a portion of the defined macrocell communication resources 121 for D2D SRS transmissions from the UE devices 104, 106.

The SRS information 126 is transmitted from the base station 102 to the first UE device 104 in a PDCCH transmission 602 and the SRS information 128 is transmitted from the as station 102 to the second UE device 106 in a PDCCH transmission 604. Therefore, the SRS information transmissions 204, 206 are PDCCH transmissions for the example of FIG. 6.

In accordance with the SRS information 126, the first UE device 104 transmits SRS transmissions 130 using the identified D2D SRS communication resources of the defined macrocell communication resources. In accordance with the SRS information 128, the second UE device 10 transmits SRS transmissions 131 using the identified D2D SRS communication resources of the defined macrocell communication resources. For the example, the D2D SRS communication resource used by each UE device are orthogonal to the D2D SRS communication resources used by other UE devices. Therefore, transmissions of SRS on a particular frequency from each UE device is during a time period when no other UE device is transmitting at that same frequency.

At events 208 and 210, the first UE device 104 and the second UE device 106 perform channel estimation by evaluating and measuring the D2D SRS transmissions. In accordance with known techniques of channel estimation, the UE devices 104, 106 measure the received SRS signals to determine parameters such as timing, path loss, and Multiple Input Multiple Output (MIMO) characteristics. Although the measurements can be used for by the receiver in the UE device, the measurements can also be used to determine the CSI.

For the examples herein, the base station 102 instructs each UE device 104, 106 how to measure the D2D SRS transmissions. Information regarding the time-frequency resources used by other UE devices can be sent in control signals for example. In addition, scrambling codes, location(s) of resources used, receive power level, and other parameters may be sent to the UE device to facilitate detection and reception of the D2D SRS transmissions.

In situations where the D2D SRS transmissions are performance using uplink communication resources, the techniques employed by conventional base stations to measure uplink channel characteristics are applied in the UE devices. The UE devices in such implementations, therefore, include uplink receivers that can used to evaluate the SRS transmission as well as to receive other signals transmitted by other UE devices using uplink communication resources.

In situations were the D2D SRS transmissions are performed using downlink communication resources, the techniques in accordance with those employed by conventional UE devices for receiving reference signals transmitted by base stations can be used to evaluate and measure the D2D SRS transmissions and determine the channel characteristics of the D2D channels between two UE devices.

The uplink information transmissions 212, 214 are PDCCH transmissions 608, 608 for the example of FIG. 6. The information in PDCCH transmissions identifies the uplink communication resources for transmitting the CSI. Each UE device 104, 106 transmits the CSI transmission 216, 218 using the communication resources in the Physical Uplink Shared Channel (PUSCH) and the Physical Uplink Control Channel (PUCCH). Therefore, a PUCCH/PUSCH transmission 610 provides the CSI from the first UE device and a PUCCH/PUSCH transmission 612 provides the CSI from the second UE device.

Figure 7A:
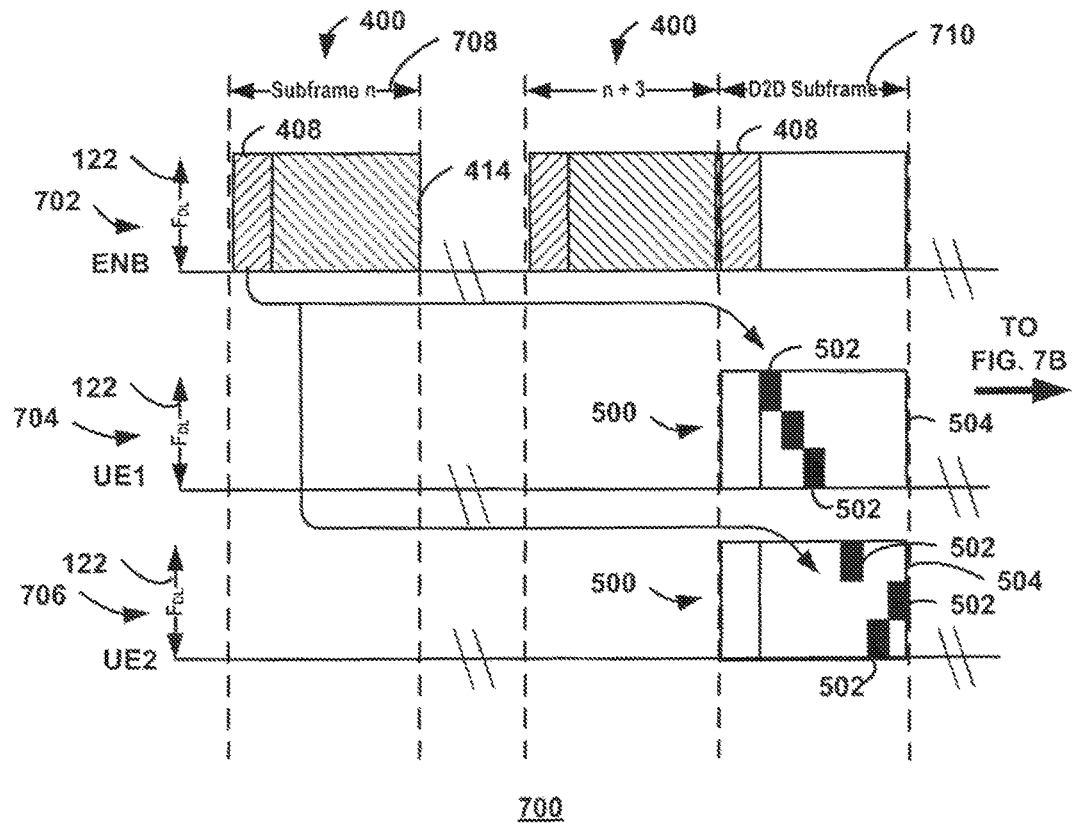
FIG. 7A and FIG. 7B are diagrams of transmissions from the base station (eNB) and the wireless communication devices (UEs) in accordance with 3GPP LTE communication specifications.
Figure 7B:
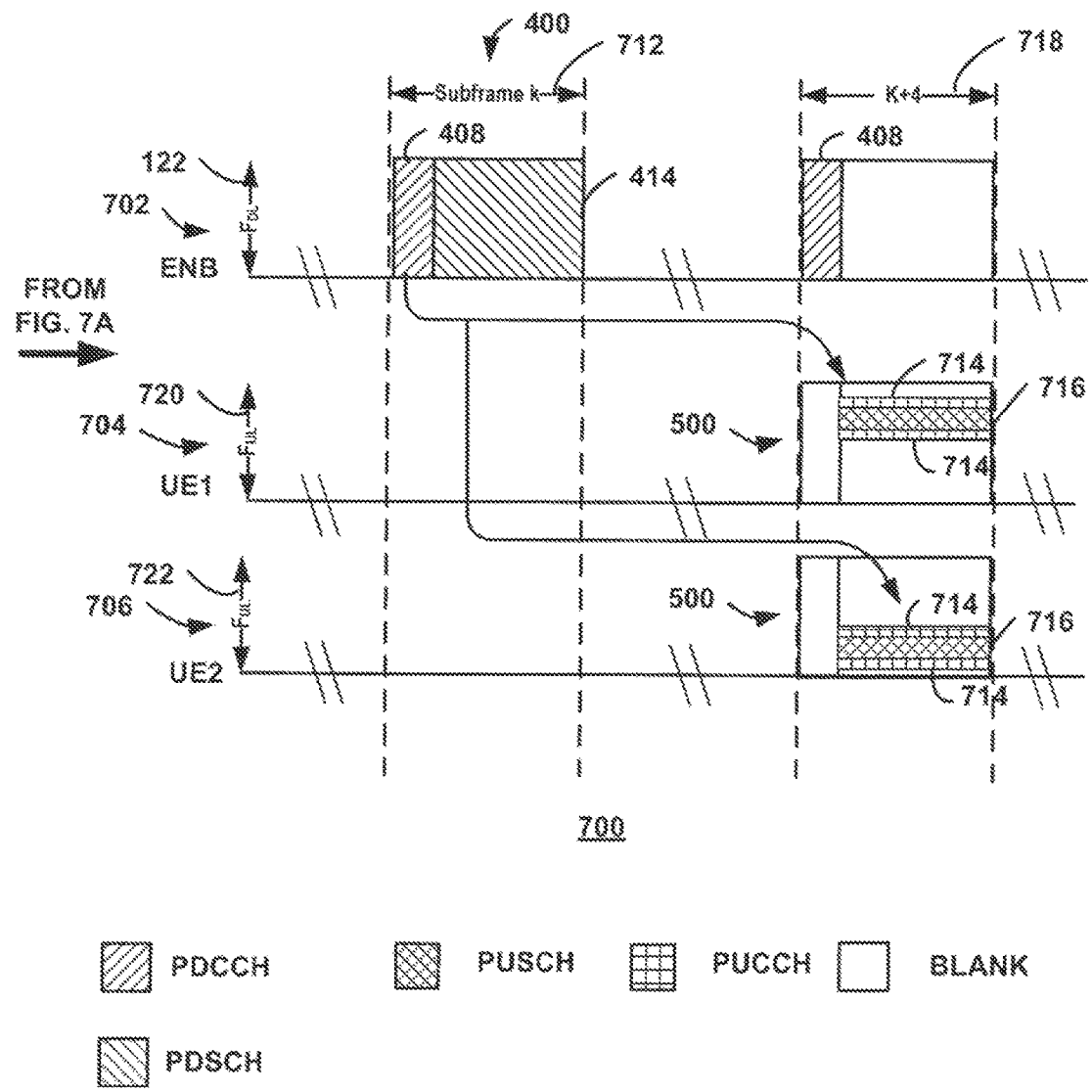

FIGS. 7A and 7B are diagrams of transmissions 702, 704, 706 from the base station (eNB) 102 and the wireless communication devices (UEs) 104, 106 in accordance with 3GPP LTE communication specifications.

For the example of FIGS. 7A and 7B, the eNB transmission 702 begins with subframe n 708 having a PDCCH that includes the D2D control information assigning resources for D2D SRS transmissions. Therefore, the SRS information transmission 126 is transmitted within the PDCCH. The D2D control information includes information directed to the first wireless communication device (UE1) for use by UE1 for a D2D transmission in a subsequent subframe. The D2D control information also includes information directed to the second wireless communication UE device (UE2) for use by UE2 for a D2D transmission in a subsequent subframe. For the example, the D2D control information in subframe n 708 identifies communication resources for D2D transmission in the subframe n+4 710. The D2D control information, however, may identify communication resources in other subframes. The D2D control information indicates to the two UE devices the subcarriers and symbol times to use for transmitting D2D SRS transmissions. Therefore, the control information in the PDCCH of subframe n 708 identifies the D2DSRSCH 502.

For this example, therefore, the eNB sends control signals in the PDCCH assigning downlink communication resources 122 for D2D SRS transmissions by the UEs. In FIG. 7A and FIG. 7B, the eNB transmission 702 in the D2D subframes 710, 712 are blank for the times when the UE devices are transmitting in the downlink channel. In some circumstances, however, the eNB transmission 704 is only blank for the time-frequency resources that are assigned for D2D transmission. Accordingly, downlink communication resources that are not assigning for D2D transmission in the D2D subframes can be used by the eNB for transmission to UE devices.

The D2D SRS communication resources used by the first UE device are orthogonal to the D2D SRS communication resources used by the second UE device. Such a configuration minimizes interference in the system.

FIG. 7B is continuation of the diagrams of transmissions 702, 704, 706 from the base station (eNB) 102 and the wireless communication devices (UEs) 104, 106 of FIG. 7A. In subframe, k 712, the eNB transmits a PDCCH that includes control information identifying uplink communication resources to be used by the UE devices to transmit CSI. Accordingly, the PDCCH identifies the PUCCH 714 and the PUSCH 716 for the first UE device and the second UE device to be used for transmitting the CSI to the eNB 102. For the example, the K+4 subframe 718 is used by both UE devices for the uplink transmission. Therefore, the first UE uplink transmission 720 and the second UE uplink transmission 722 include the CSI in the k+4 subframe.

The reception and the transmission of the signals by the UE devices discussed can be performed by any UE device having the appropriate electronics and code. An example of a suitable transceiver is discussed in the related patent application entitled "DEVICE TO DEVICE COMMUNICATION MANAGEMENT USING MACROCELL COMMUNICATION RESOURCES", referenced above. The example of FIG. 7A and FIG. 7B is directed to D2D SRS transmission in the downlink frequency band. The techniques discussed in this patent application and the related patent application can be applied to the uplink frequency band. The required signal transmission and/or reception function may be facilitated with modifications to conventional UE transceivers or the inclusion of additional transceivers.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a first user equipment (UE) device, the method comprising:
communicating with a second UE device over a device-to-device (D2D) communication link using uplink radio resources defined by a communication specification for uplink communication between base stations and wireless communication UE devices, the uplink radio resources including uplink reference signal resources for transmitting uplink reference signals;
transmitting data and control signals to the second UE device over the D2D communication link, wherein the transmitting occurs on uplink radio resources other than the uplink reference signal resources; and
transmitting a D2D demodulation signal along with the data signals to the second UE device, the D2D demodulation signal used by the second UE device to demodulate the data signals.

2. The method of claim 1, further comprising:
demodulating a data signal transmitted from the first UE device using the D2D demodulation signal.

3. The method of claim 1, wherein the uplink radio resources are time-frequency communication resources having a specified times and frequencies.

4. The method of claim 3, wherein the uplink radio resources are organized into a plurality of frequency bands and a plurality of time segments.

5. The method of claim 4, wherein the uplink radio resources comprise a plurality of frequency bands divided in time by a series of periodically repeating frames, each frame comprising a plurality of time slots, wherein each time-frequency resource is at least one time slot and at least one frequency band.

6. The method of claim 5, wherein the communication specification is The Third-Generation Partnership Project Long-Term Evolution (3GPP LTE) communication specification.

7. The method of claim 1, wherein the D2D demodulation signal is scrambled with codes that are function of the first UE device.

8. The method of claim 1, wherein the D2D demodulation signal is scrambled with codes that are function of a Cell ID of a base station.

9. A communication system comprising:
a first wireless communication user equipment (UE) device;
a second wireless communication UE device;
a base station; and
a scheduler configured to assign uplink radio resources, defined by a communication specification for uplink communication between base stations and wireless communication UE devices, as device-to-device (D2D) communication resources, the uplink radio resources including uplink reference signal resources for transmitting uplink reference signals,
the first wireless communication UE device configured to transmit data and control signals to the second wireless communication UE device over the D2D communication resources, wherein the data and control signals are transmitted on uplink radio resources other than the uplink reference signal resources,
the first wireless communication UE device further configured to transmit a D2D demodulation signal along with the data signals to the second wireless communication UE device, the second wireless communication UE device configured to use the D2D demodulation signal to demodulate the data signals.

10. The communication system of claim 9, wherein the communication specification is The Third-Generation Partnership Project Long-Term Evolution (3GPP LTE) communication specification.

11. The communication system of claim 9, wherein the first UE device is configured to scramble the D2D demodulation signal with codes that are function of the first UE device.

12. The communication system of claim 9, wherein the first UE device is configured to scramble the D2D demodulation signal with codes that are function of a Cell ID of the base station.

13. A first user equipment (UE) device comprising:
a transceiver; and
a controller coupled to the transceiver, the controller including at least one processor and at least one memory, the controller configured to cause the first UE device to
communicate with a second UE device over a device-to-device (D2D) communication link using uplink radio resources of cellular communication, the uplink radio resources including uplink reference signal resources for transmitting uplink reference signals;
transmit data and control signals to the second UE device over the D2D communication link, wherein the data and control signals are transmitted on uplink radio resources other than the uplink reference signal resources; and
transmit a D2D demodulation signal along with the data signals to the second UE device, the D2D demodulation signal used by the second UE device to demodulate the data signals.

14. The first UE device of claim 13, wherein the controller is further configured to cause the first UE device to transmit the data and control signals over the D2D communication link in accordance with The Third-Generation Partnership Project Long-Term Evolution (3GPP LTE) communication specification.

15. The first UE device of claim 13, wherein the controller is further configured to cause the first UE device to scramble the D2D demodulation signal with codes that are function of the first UE device.

16. The first UE device of claim 13, wherein the controller is further configured to cause the first UE device to scramble the D2D demodulation signal with codes that are function of a Cell ID of a base station.

17. A device to be equipped in a first user equipment (UE) device, the device comprising:
at least one memory; and
at least one processor coupled to the memory, the at least one processor configured to cause the first UE device to
communicate with a second UE device over a device-to-device (D2D) communication link using uplink radio resources of cellular communication, the uplink radio resources including uplink reference signal resources for transmitting uplink reference signals;
transmit data and control signals to the second UE device over the D2D communication link, wherein the data and control signals are transmitted on uplink radio resources other than the uplink reference signal resources; and
transmit a D2D demodulation signal along with the data signals to the second UE device, the D2D demodulation signal used by the second UE device to demodulate the data signals.

18. The device of claim 17, wherein the at least one processor is further configured to cause the first UE device to transmit the data and control signals over the D2D communication link in accordance with The Third-Generation Partnership Project Long-Term Evolution (3GPP LTE) communication specification.

19. The device of claim 17, wherein the at least one processor is further configured to cause the first UE device to scramble the D2D demodulation signal with codes that are function of the first UE device.

20. The device of claim 17, wherein the at least one processor is further configured to cause the first UE device to scramble the D2D demodulation signal with codes that are function of a Cell ID of a base station.

* * * * *